(12) United States Patent
Nishitani et al.

(10) Patent No.: US 10,137,927 B2
(45) Date of Patent: Nov. 27, 2018

(54) RACK GUIDE FOR RACK AND PINION STEERING DEVICE, RACK AND PINION STEERING DEVICE AND MANUFACTURING METHOD OF RACK GUIDE FOR RACK AND PINION STEERING DEVICE

(71) Applicant: OILES CORPORATION, Tokyo (JP)

(72) Inventors: Yosuke Nishitani, Kanagawa (JP); Yoshimitsu Ishida, Kanagawa (JP)

(73) Assignee: OILES CORPORATION, Tokyo (JP)

( * ) Notice: Subject to any disclaimer, the term of this patent is extended or adjusted under 35 U.S.C. 154(b) by 575 days.

(21) Appl. No.: 14/443,481

(22) PCT Filed: Nov. 5, 2013

(86) PCT No.: PCT/JP2013/079815
§ 371 (c)(1),
(2) Date: May 18, 2015

(87) PCT Pub. No.: WO2014/077146
PCT Pub. Date: May 22, 2014

(65) Prior Publication Data
US 2015/0291205 A1 Oct. 15, 2015

(30) Foreign Application Priority Data

Nov. 19, 2012 (JP) ................................. 2012-253439

(51) Int. Cl.
*B62D 3/00* (2006.01)
*B62D 3/12* (2006.01)
(Continued)

(52) U.S. Cl.
CPC ................ *B62D 3/123* (2013.01); *B21J 5/00* (2013.01); *F16H 19/04* (2013.01); *F16H 55/283* (2013.01)

(58) Field of Classification Search
CPC .......... B62D 3/123; B62D 3/12; B62D 3/126; F16H 55/28; F16H 19/04; F16H 55/283; B21J 5/00
(Continued)

(56) References Cited

U.S. PATENT DOCUMENTS 3,623,379 A * 11/1971 Bradshaw .............. B62D 3/123
74/422
3,979,968 A * 9/1976 Ceccherini ............. B62D 3/123
74/409

(Continued)

FOREIGN PATENT DOCUMENTS

CN 202529026 11/2012
JP 62-38774 3/1987
(Continued)

OTHER PUBLICATIONS

Official Action, along with English-language translation thereof, for CN Appl. No. 201380060167.0 dated May 24, 2016.
(Continued)

*Primary Examiner* — Victor L MacArthur
(74) *Attorney, Agent, or Firm* — Greenblum & Bernstein, P.L.C.

(57) ABSTRACT

A rack guide for a rack and pinion steering device, a rack and pinion steering device and a manufacturing method for a rack guide for a rack and pinion steering device, has a simple configuration with a close contact property being kept between a rack guide and a rack guide base member to ensure quietness. A rack guide for a rack and pinion steering device includes: a casing; a pinion to be slidably supported by said casing; a rack bar having a rack tooth meshed with said pinion; a rack guide including an abutment portion to which said rack bar is to be slidably abutted and a recessed portion, which is continued to said abutment portion, to be spaced from said rack bar; a rack guide base member for
(Continued)

receiving said rack guide; and urging means for urging said rack guide against said rack bar through said rack guide base member.

25 Claims, 8 Drawing Sheets

(51) Int. Cl.
    *F16H 55/28* (2006.01)
    *F16H 19/04* (2006.01)
    *B21J 5/00* (2006.01)

(58) Field of Classification Search
    USPC .................... 74/422, 409, 89.11; 384/276
    See application file for complete search history.

(56) References Cited

U.S. PATENT DOCUMENTS

| | | | | |
|---|---|---|---|---|
| 4,593,578 | A * | 6/1986 | Kobayashi | B62D 3/123 |
| | | | | 180/428 |
| 4,640,148 | A * | 2/1987 | Hasegawa | B62D 3/123 |
| | | | | 74/422 |
| 5,203,216 | A * | 4/1993 | Hasegawa | B62D 3/123 |
| | | | | 74/422 |
| 5,906,138 | A * | 5/1999 | Kostrzewa | B62D 3/123 |
| | | | | 384/37 |
| 6,178,843 | B1 * | 1/2001 | Machida | B62D 3/123 |
| | | | | 384/276 |
| 6,390,230 | B1 * | 5/2002 | Shimizu | B21K 1/767 |
| | | | | 180/444 |
| 6,543,569 | B1 * | 4/2003 | Shimizu | B21K 1/767 |
| | | | | 180/444 |
| 7,225,522 | B1 * | 6/2007 | Little | B21D 26/14 |
| | | | | 29/505 |
| 7,281,444 | B1 * | 10/2007 | Bishop | B62D 3/123 |
| | | | | 74/388 PS |
| 7,305,901 | B2 * | 12/2007 | Joachim | B62D 3/123 |
| | | | | 74/388 PS |
| 7,458,291 | B2 * | 12/2008 | Douma | B62D 3/123 |
| | | | | 277/312 |
| 8,863,599 | B2 * | 10/2014 | Crossman | B62D 3/123 |
| | | | | 74/388 PS |
| 9,296,412 | B2 * | 3/2016 | Witting | B62D 3/123 |
| 2012/0248724 | A1 * | 10/2012 | Watanabe | B62D 3/12 |
| | | | | 280/93.514 |

FOREIGN PATENT DOCUMENTS

| | | | | |
|---|---|---|---|---|
| JP | 2-65674 | | 5/1990 | |
| JP | 07323849 | A * | 12/1995 | ............ B62D 3/123 |
| JP | 11-91592 | | 4/1999 | |
| JP | 2000-168577 | | 6/2000 | |
| JP | 2000-177604 | | 6/2000 | |
| JP | 2001-10510 | | 1/2001 | |
| JP | 2001-151132 | | 6/2001 | |
| JP | 2002-002506 | | 1/2002 | |
| JP | 2003-312502 | | 11/2003 | |
| JP | 2006-56205 | | 3/2006 | |

OTHER PUBLICATIONS

Extended European Search Report for EP Appl. No. 13855703.8 dated Aug. 9, 2016.
"General Catalog Oiles Bearing 2011 » 2012", Oiles Corporation, May 11, 2011.
International Preliminary Report on Patentability with English-language Translation for PCT/JP2013/079815 dated May 19, 2015.
Written Opinion of International Searching Authority with English-language Translation for PCT/JP2013/079815 dated Dec. 17, 2013.
International Search Report with English-language Translation for PCT/JP2013/079815 dated Dec. 17, 2013.
Official Action, along with English-language translation thereof, for South Korean Pat. Appl. No. 10-2015-7016297 dated May 3, 2016.
European Search Report in counterpart European Application No. 18 16 6300, dated Sep. 7, 2018.

* cited by examiner

RACK GUIDE FOR RACK AND PINION STEERING DEVICE, RACK AND PINION STEERING DEVICE AND MANUFACTURING METHOD OF RACK GUIDE FOR RACK AND PINION STEERING DEVICE

TECHNICAL FIELD

The present invention relates to a rack guide, capable of enhancing close contact to a rack guide base member, for a rack and pinion steering device rack pinion a rack and pinion steering device provided with said rack guide and a method for manufacturing said rack guide.

BACKGROUND ART

A rack and pinion steering device conventionally used is provided with a casing, a pinion rotatably supported by the casing, a rack bar on which rack teeth to be meshed with said pinion is formed, a rack guide slidably supporting the rack bar and disposed in the casing, a rack guide base member supporting an outer surface of the rack guide and a spring pressing the rack guide toward the rack bar through the rack guide base member (patent literature 1).

The rack guide of the rack and pinion steering device as configured above is a member formed so as to have a curbed surface constituted by a plurality of curvature radiuses to prevent sliding resistance of rack bar from being excessive when the movable rack bar is moved relative to the rack guide. Accordingly, to ensure the rack guide base member to hold the rack guide, a rack guide support surface of the rack guide base member to be abutted to the rack guide is processed so as to have a shape complementary to a curbed surface having a plurality of curvature radiuses similarly to the rack guide.

PRIOR ART LITERATURE

Patent Literature

Patent literature 1: Japanese patent Laid-open application No. 2001-10510.

SUMMARY OF THE INVENTION

A Problem to be Solved by the Invention

By a processing technique conventionally utilized, it is possible to form a rack guide support surface complementary to an outer surface of the rack guide at a desired accuracy. However, in consideration of that the outer surface of the rack guide and a support surface of the rack guide base member come into close contact with each other at a high accuracy to ensure quietness, it is difficult to simplify manufacturing processes of a rack guide, a mold, a rack guide base member on which a rack guide is mounted, and so on. Further, since it is difficult to simplify the manufacturing process, it is difficult to reduce manufacturing costs further.

The invention is made in view of the above circumstances. Namely, it is an object that to provide a rack guide for a rack and pinion steering device, a rack and pinion steering device and a manufacturing method for a rack guide for a rack and pinion steering device, having a simple configuration with a close contact property being kept between a rack guide and a rack guide base member to ensure quietness.

Means for Solving a Problem

To solve the above mentioned problem and attain the object, a first aspect of the invention is a rack and steering device of the invention comprising: a casing; a pinion to be slidably supported by said casing; a rack bar having a rack tooth meshed with said pinion; a rack guide comprising an abutment portion to which said rack bar is to be slidably abutted and a recessed portion, which is continued to said abutment portion, to be spaced from said rack bar; a rack guide base member for receiving said rack guide; and urging means for urging said rack guide against said rack bar through said rack guide base member, wherein a thickness dimension of said recessed portion is different from that of said abutment portion.

A second aspect of a rack and steering device of the invention is that, according to said first aspect of said rack and steering device, said thickness dimension of said recessed portion becomes gradually decreasing as the recessed portion becomes away from said abutment portion.

A third aspect of a rack and steering device of the invention is that, according to said first or second aspect of said rack and steering device, an abutment surface of abutment portion to be abutted to said rack bar has a surface constituted by a plastic material.

A fourth aspect of a rack and steering device of the invention is that, according to any of said first to third aspects of said rack and steering device, an outer surface of said rack guide to be abutted to said rack guide base member has a single curvature radius, or a single inclination at each of a right side and a left side with respect to a central line.

A fifth aspect of a rack and steering device of the invention is that, according to said third aspect of said rack and steering device, said plastic material is a resin, a porous metal or a sintered alloy.

Further, to solve the above mentioned problem and attain the object, a first aspect of a rack guide manufacturing method of the invention is a rack guide manufacturing method for manufacturing a rack guide to be received by a rack guide base member, for a rack and pinion steering device, said rack guide comprising: an abutment portion to which a rack bar is to be abutted; and a recessed portion to be spaced away from said rack bar, said abutment portion being capable of supporting said rack bar in such a manner that a pinion and said rack bar are meshed with each other, wherein processing is made to a work piece to have a predetermined thickness in such a manner that a thickness dimension of said recessed portion is different from that of said abutment portion.

A second aspect of a rack guide manufacturing method of the invention is that, according to said first aspect of rack guide manufacturing method, a portion of said work piece becoming an abutment surface of said abutment portion to be abutted to said rack bar is provided with a surface formed from a resin, a porous metal or a sintered alloy.

A third aspect of a rack guide manufacturing method of the invention is that, according to said second aspect of rack guide manufacturing method, processing in which said work piece is made to have said predetermined thickness is performed by pressing a portion of said work piece becoming said recessed portion.

A fourth aspect of a rack guide manufacturing method of the invention is that, according to any of said first to third aspects of rack guide manufacturing method, an outer surface of said rack guide to be abutted to said rack guide base member has a single curvature radius, or a single inclination at each of a right side and a left side with respect to a central line.

To solve the above mentioned problem and attain the object, a first aspect of rack guide for a rack and pinion steering device of the invention is that a rack guide for a rack and pinion steering device, to be received by a rack guide base member, said rack guide being capable of supporting a rack bar in such a manner that a pinion and said rack bar are meshed with each other, said rack guide comprises: an abutment portion to which said rack bar is to be slidably abutted; and a recessed portion, which is continued to said abutment portion, to be spaced from said rack bar, wherein a thickness dimension of said recessed portion is different from that of said abutment portion.

A second aspect of rack guide for a rack and pinion steering device of the invention is that, according to said first aspect of rack guide for a rack and pinion steering device, a said thickness dimension of said recessed portion becomes gradually decreasing as the recessed portion becomes away from said abutment portion.

A third aspect of rack guide for a rack and pinion steering device of the invention is that, according to said first or second aspect of rack guide for a rack and pinion steering device, an abutment surface of said abutment portion abuttable to said rack bar is provided with a surface constituted by a resin, a porous metal or a sintered alloy.

A fourth aspect of rack guide for a rack and pinion steering device of the invention is that, according to any of said first to third aspect of rack guide for a rack and pinion steering device, an outer surface of said rack guide abuttable to said guide base member has a single curvature radius, or a single inclination at each of a right side and a left side with respect to a central line.

Effect of the Invention

According to the present invention, a rack guide for a rack and pinion steering device, a rack guide with which a rack and pinion steering device is provided, and a rack guide manufactured by a manufacturing method of a rack guide for a rack and pinion steering device, are provided with an abutment portion and a recessed portion to be abutted to a rack guide base member, the abutment portion and the recessed portion having a thickness dimension different from each other, so that an outer surface has a curvature radius with a single dimension. Accordingly, a shape of the outer surface of rack guide to be supported by the rack guide base member is simplified so that a close contact property of rack guide to the rack guide base member can be readily obtained. As a result, while quietness of rack guide is obtained, manufacturing costs can be reduced.

BRIEF DESCRIPTION OF THE DRAWINGS

FIG. 6(a) illustrating a state before a material member is pressed and FIG. 6(b) illustrating a state where the material member is pressed;

EMBODIMENTS FOR CARRYING OUT THE INVENTION

Embodiments of a rack and pinion steering device provided with a rack guide for a rack and pinion steering device of the present invention will be hereinafter described in accordance with referring to the accompanying drawings. The invention is not limited to the embodiments.

First Embodiment

Figure 1:
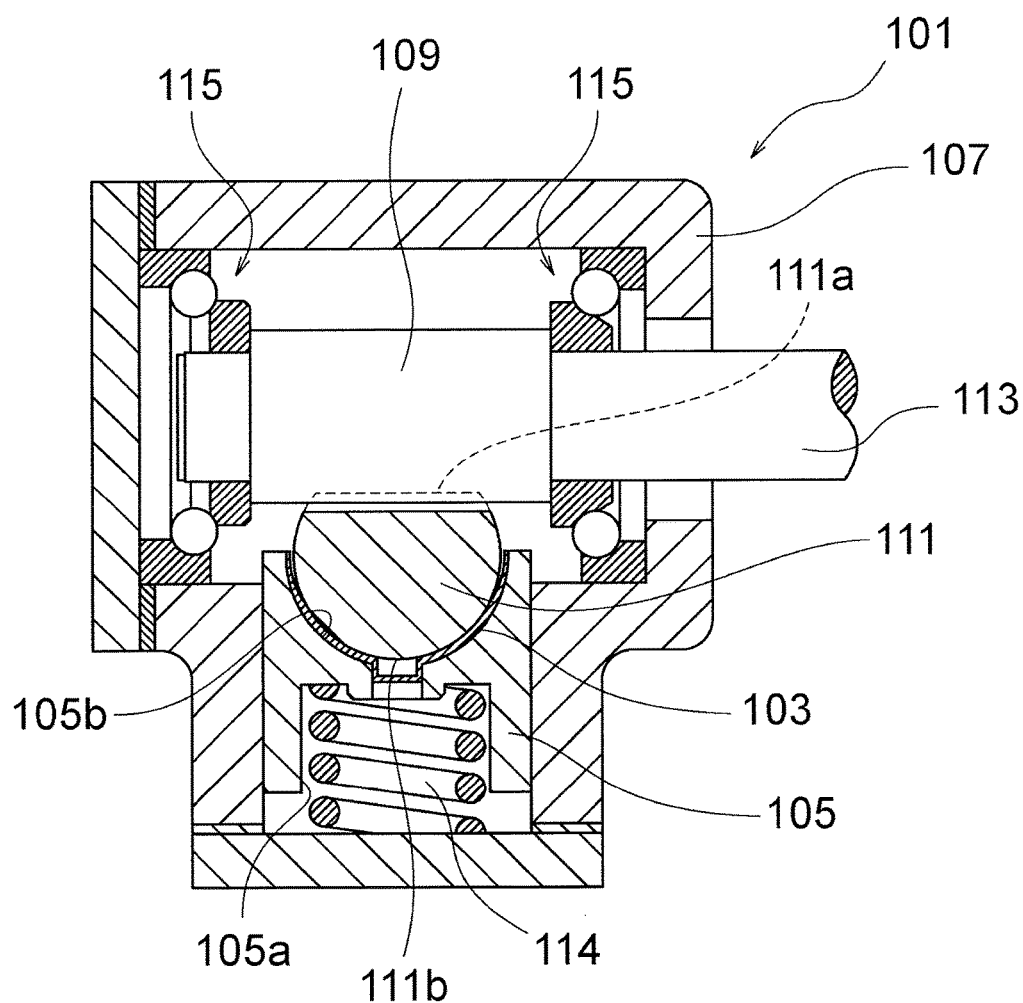
FIG. 1 is a partial longitudinal sectional view schematically illustrating a part of rack and pinion steering device of the first embodiment.
Figure 2:
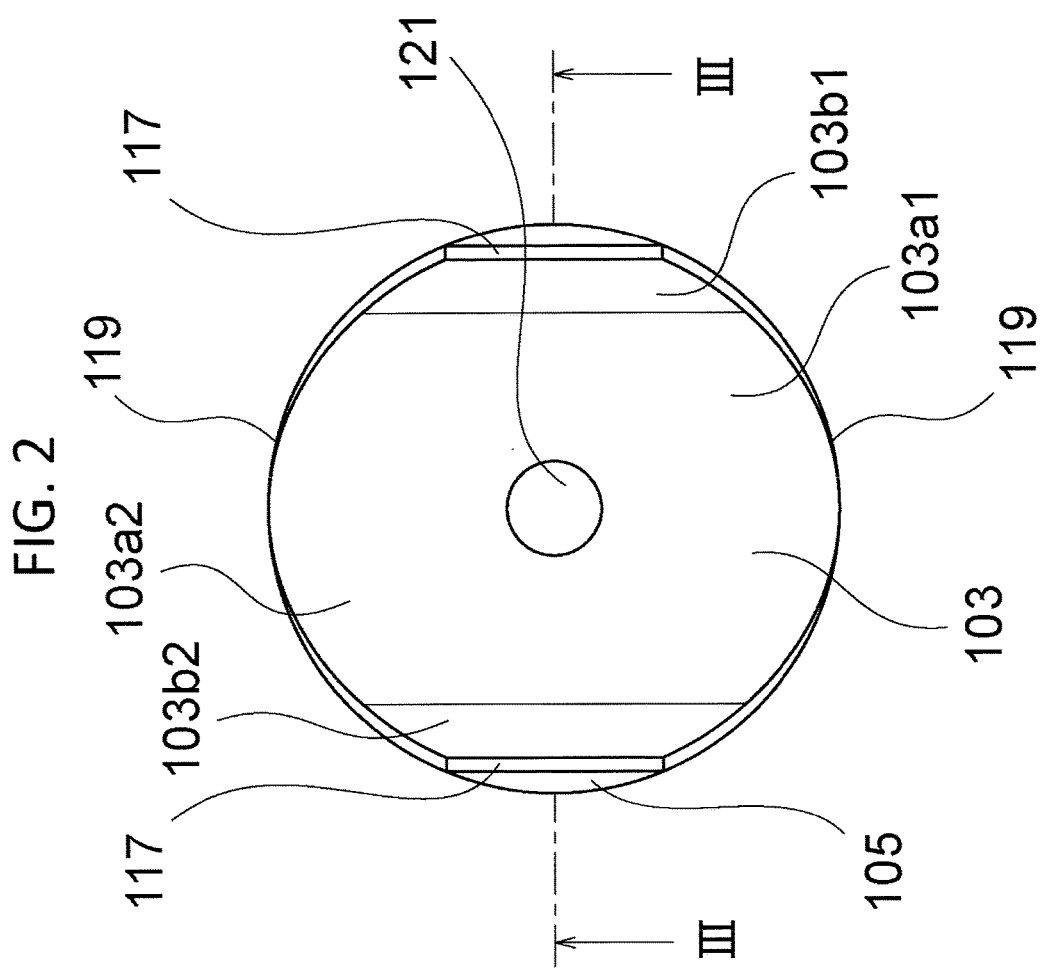
FIG. 2 is a plan view of a rack guide and a rack guide base member illustrated in FIG. 1.
Figure 3:
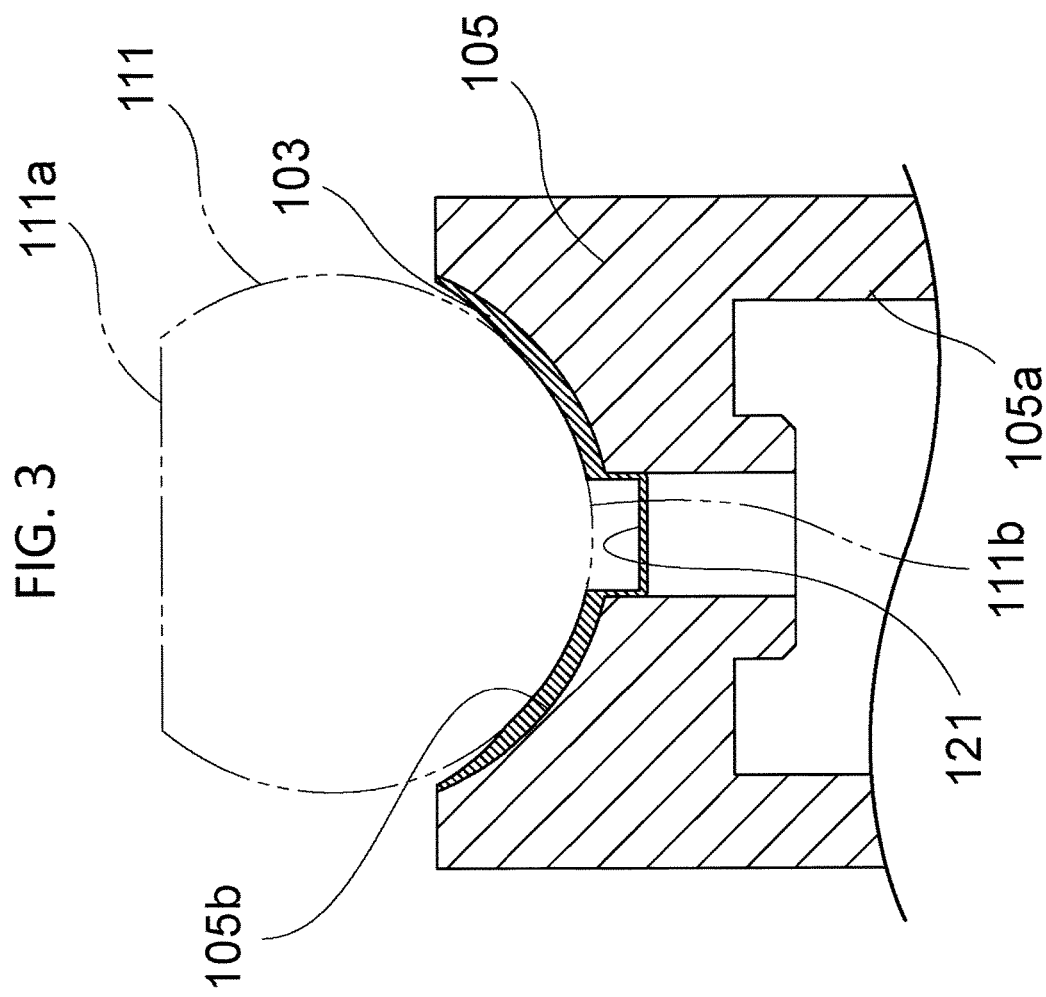
FIG. 3 is a cross sectional view taken along a line of FIG. 2.
Figure 4:
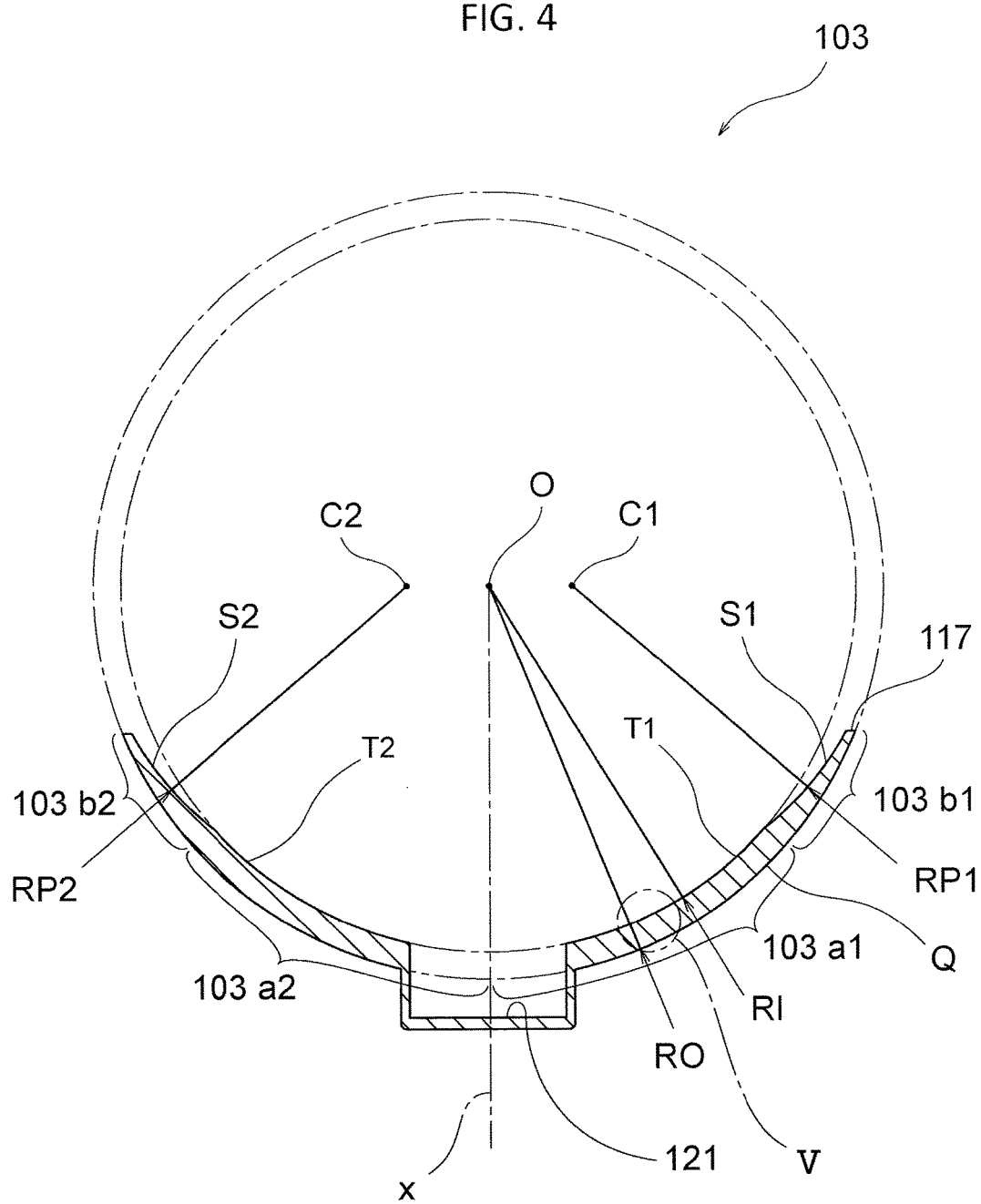
FIG. 4 is an enlarged cross sectional view by enlarging the rack guide illustrated in FIG. 1.
Figure 5:
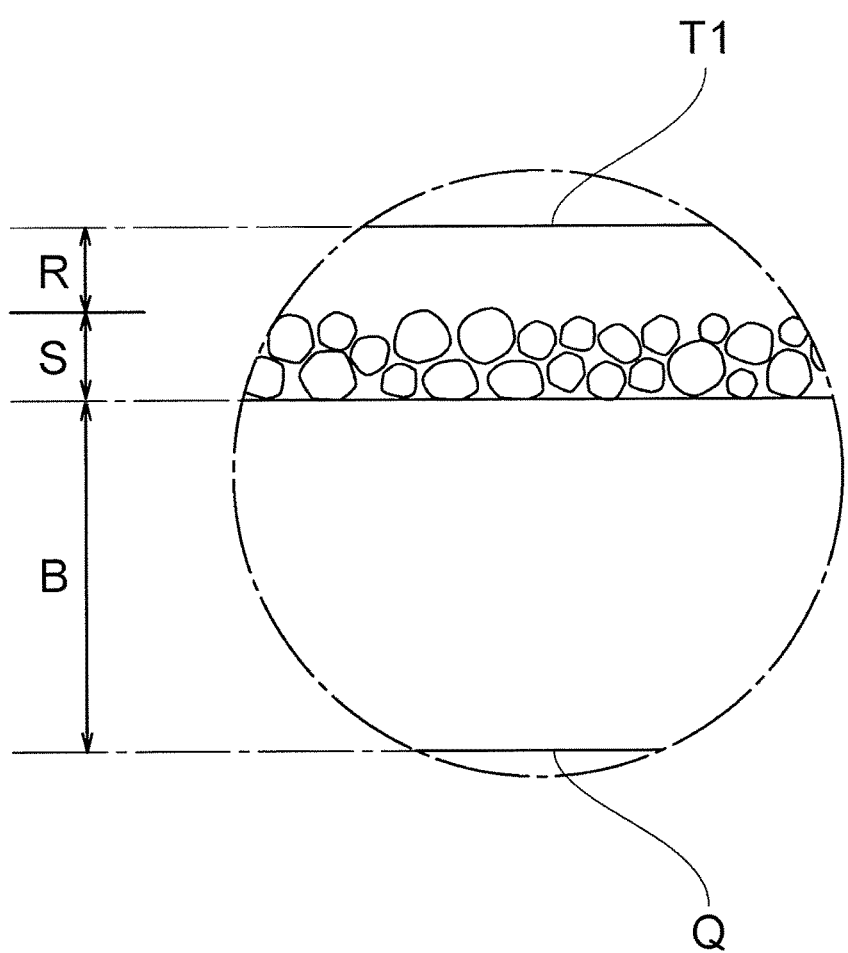
FIG. 5 is an enlarged cross sectional view of V portion of FIG. 4.
Figure 6:
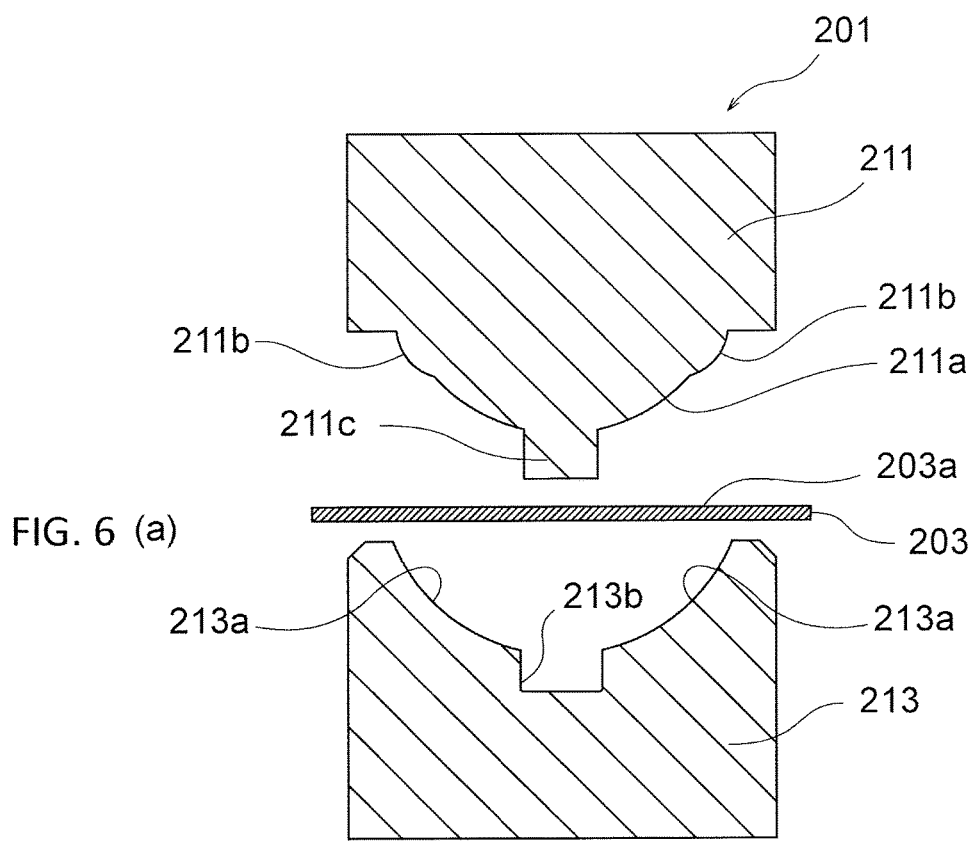
FIGS. 6(a) and 6(b) are a cross sectional view illustrating manufacturing steps of a rack guide.
Figure 6:
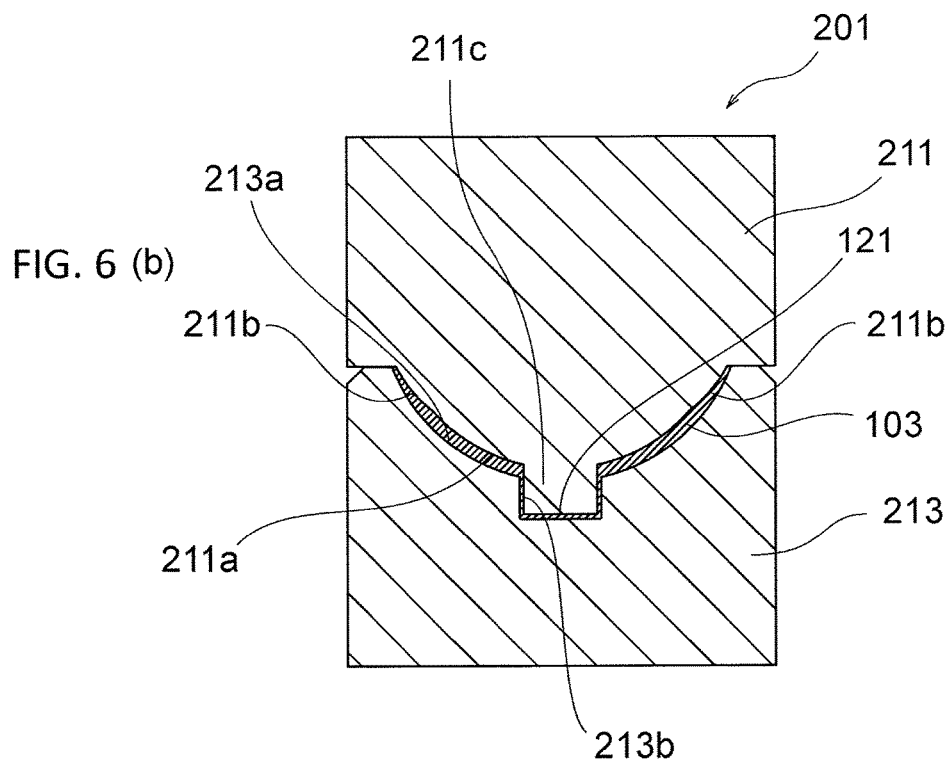

FIG. 1 is a partial longitudinal sectional view schematically illustrating a part of rack and pinion steering device 101 of the first embodiment, FIG. 2 is a plan view of a rack guide 103 and a rack guide base member 105 illustrated in FIG. 1, FIG. 3 is a cross sectional view taken along a line (diameter of rack guide base member 105) of FIG. 2, FIG. 4 is an enlarged cross sectional view by enlarging the rack guide 103 illustrated in FIG. 1, and FIG. 5 is an enlarged cross sectional view of V portion of FIG. 4. FIGS. 1, 4 and 6 similar to FIG. 3 illustrate a cross sectional view taken along an imaginary plane dividing a straight line like edge portion 117 into two equal parts and passing a central line x of rack guide 103, a rack guide base member 105, and a fixing portion 121 which are concentric with each other.

As illustrated in FIG. 1, rack and pinion steering device 101 is mainly provided with a casing 107 as a housing, a pinion 109 rotatably supported in casing 107, a rack bar 111 having rack teeth 111a to be meshed with a pinion 109, a rack guide 103 including: abutment portions 103a1 103a2 to which rack bar 111 is to be slidably abutted; and recessed portions 103b1, 103b2 spaced away from rack bar 111 and continued to abutment portions 103a1, 103a2, a rack guide base member 105 for receiving rack guide 103, an elastic member 114, which is urging means, for urging rack guide 103 against rack bar 111 through rack guide base member 105. A thickness dimension of recessed portions 103b1, 103b2 is different from a thickness dimension of abutment portions 103a1, 103a2 (difference between RO and RI). The thickness dimension will be described below with referring to FIG. 4. Further, in this embodiment, an outer surface Q constituting a support surface of rack guide 10 to be abutted to rack guide base member 105 has a single curvature radius RO. Abutment portions 103a1, 103a2 in contact with rack bar 111 and recessed portions in no contact with rack bar 111 are provided to adjust a sliding area of rack bar 111 with respect to rack guide 103.

Pinion 109 described before is a circular gear and connected with one end portion of a steering axis 113, and a steering wheel not illustrated in drawings, which is utilized for making steering by an operator is mounted on the other end portion of steering axis 113. Pinion 109 is rotationally supported by a pair of rolling bearings 115 disposed in a casing 107. Rack bar 111 extending in a direction crossing an axial center direction (a right and left direction in FIG. 1) of steering axis 113 is disposed so as to penetrate casing 107.

Rack bar 111 is provided with rack teeth 111a, and rack teeth 111a are meshed with a pinion 109 so that a rotary motion of steering axis 113 is converted into a linear motion of rack bar 111 through pinion 109 and rack teeth 111a. Further, rack bar 111 is provided with a circular arc-shaped portion 111b, having a predetermined curvature radius, continued to a portion where rack teeth 111a are formed.

As illustrated in FIGS. 1 to 3, rack guide base member 105 placed in casing 107 is a cylindrical member and a movement of rack guide base member 105 is restricted by a wall surface of casing 107 so as to move only in an up and down direction of FIG. 1. Rack guide base member 105 is provided with an elastic member containing portion 105a for containing a part of a coil spring 114, an end of coil spring 114 abutting to elastic member receiving portion 105a, and a rack guide receiving portion 105b, which is a concave portion for rack guide 103 and is provided at a side of circular arc-shaped portion 111 of rack bar 111.

Additionally, other end of coil spring 114 is fixed on an inner wall of casing 107. Accordingly, rack guide base member 105 is urged by elastic force of coil spring 114 through rack guide 103 so as to maintain an engagement between rack teeth 111a of rack bar 111 and pinion 109 of steering axis 113.

As illustrated in FIG. 2, when viewed in a plan view, rack guide 103 is provided with two straight line like edge portions 117, which are parallel to each other and two circular arc-shaped portions 119 connected with two straight line like edge portions 117. Additionally, rack guide 103 has a fixing portion 121 formed as a concave portion by drawing and so on at a center thereof when viewed in a plan view. A shape and a dimension of fixing portion 121 may be altered as required. Fixing portion 121 is penetrated into a through opening provided in rack guide base member 105 so that a positioning of rack guide 103 is made with respect to rack guide base member 105. In this embodiment, fixing portion 121 is positioned so as to be surrounded by abutment portions 103a1, 103a2.

Since, as illustrated in FIG. 4, a cross section of rack guide 103 is symmetrical shape with respect to a central line x of rack guide 103, a right half portion of rack guide 103 will be described below. A thickness dimension (length in a radial direction with respect to a center of curvature O) of abutment portion 103a1 is constant. An outer surface Q of abutment portion 103a1 has a curvature radius represented by RO with the center of curvature O. An inner surface T1 of abutment portion 103a1 has a curvature radius represented by RI with the center of curvature O.

Furthermore, recessed portion 103b1 is continued to other end portion of abutment portion 103a1. A thickness (length in a radius direction with respect to the center of curvature O) of recessed portion 103b1 becomes gradually decreasing as recessed portion 103b1 becomes away from abutment portion 103a1. Namely, as recessed portion 103b1 becomes away from abutment portion 103a1, an inner surface S1 extends so as to become closer to outer surface Q. Further, an inner surface T1 of abutment portion 103a1 extends on a circumference having curvature radius RI with a center of curvature O, and an inner surface S1 of recessed portion 103b1 extends on a circumference having a curvature radius RP with a center of curvature C1 spaced away from center of curvature O.

In the embodiment, a curvature radius of circular arc-shaped portion 111b of rack bar 111 has a same dimension as curvature radius RI of abutment portions 103a1, 103a2 of rack guide 103.

Since abutment portion 103a2 and recessed portion 103b2 positioned at a left side with respect to central line x illustrated in FIG. 4, as described above, are symmetry to abutment portion 103a1 and recessed portion 103b1 positioned at a right side with respect to central line x, it is configured that inner surfaces T1, T2 of rack guide 103 are abutted to rack bar 111, and straight line like edge portion 117 and recessed portions 103b1, 103b2 of rack guide 103 at a side of circular arc-shaped edge portion 119 are not abutted to rack bar 111. Positions of centers of curvature C1, C2 and dimensions of curvature radiuses RO, RP1, RP2 may be determined in accordance with a dimension of area of abutment portions 103a1, 103a2 to be abutted to circular arc-shaped portions 111b of rack bar 111.

In addition, as illustrated in FIG. 5, rack guide 103 is a member laminated in three layers and is provided with a base plate B constituted by a steel plate and so on, a porous sintered metal layer S formed by sintering metallic powder of bronze series and the like on base plate B, a resin layer R formed on porous sintered metal layer S in a thin film like form from a material containing a tetrafluoroethylene resin.

Furthermore, since porous sintered metal layer S is constituted by a bronze series material, which is excellent in sliding characteristic, even if rack bar 11 is slid on porous sinter metal layer S due to that rack guide 103 falls in a state where resin layer R wears to expose porous sintered metal layer S, damage due to abrupt wear-out and seizure of rack bar 111 can be prevented from occurring.

As a member of a three-layer structure used for rack guide 103, Oiles Drymet LF, ST manufactured by OILES CORPORATION and so on may be utilized. Since it is configured that resin layer R is provided, a thickness of rack guide 103 can be readily adjusted.

As described above, since porous sintered metal layer S is provided underneath resin layer R, regardless of that a thickness of resin layer R is relatively thin, strength of rack guide 103 necessary for functioning as a rack guide can be ensured.

(Manufacturing Method of Rack Guide)

A manufacturing method of the above mentioned rack guide 103 will be described below while refereeing mainly to FIG. 6. FIG. 6 is a cross sectional view illustrating manufacturing steps of rack guide 103; FIG. 6(a) illustrating a state before a material member 203 is pressed and FIG. 6(b) illustrating a state where material member 203 is pressed. In this embodiment, material member 203 as a work piece having the above-mentioned three-layer structure (see FIG. 5.) and formed in a predetermined shape and dimension by blanking is prepared.

By a press apparatus 201 of this embodiment, I) a drawing step for forming a fixing portion 121; II) bending step for bending material member 203 so as to have a predetermined curvature radius; and III) pressing step for performing pressing to a predetermined thickness are carried out. Since an arrangement of press apparatus 201 of this embodiment is a conventionally known structure except for a pair of dies 211, 213, the pair of dies 211, 213 will be described hereinafter.

The pair of dies 211, 213 is placed opposed to each other with the pair of dies 211, 213 being capable of moving away from and toward each other. Upper die 211 has press surfaces 211a, 211b complementary to inner surfaces T1, T2, S1, S2 of rack guide 103 which is a finished product. Namely, a first upper side press surface 211a is a convex surface having a curvature radius RI same as inner surfaces T1, T2 which are abutment surfaces of abutment portions 103a1, 103b1; and a second upper side press surface 211b is a convex surface having curvature radiuses RP1, RP2 same as inner surfaces S1, S2 of recessed portions 103b1, 103b2. Similarly, lower die 213 has a lower press surface 213a complementary to outer surface Q of rack guide 103 which is a finished product. Namely, a lower side press surface 213a is a concave surface having a curvature radius RO same as outer surface Q of rack guide 103.

Pressing is performed in a manner that material member 203 is placed between upper die 211 and lower die 213 (see FIG. 6a) and upper die 211 and lower die 213 are abutted to each other by driving means which is not illustrated.

As discussed above, upper die 211 and lower die 213 are joined together so that material member 203 which is a semifinished product is processed so that upper surface 203a which is a first surface of material member 203 is formed to have curvature radiuses RI, RO and recessed portions 103b1, 103b2 are pressed (namely plastically deformed) to a predetermined thickness.

Although the manufacturing method of this embodiment is provided with a pressing step for deforming resin layer R plastically, a grinding step in which recessed portions 103b1, 103b2 are made to have a predetermined thickness by grinding resin layer R may be provided in place of the pressing step. Further, although it is configured in this embodiment that the drawing step, bending step and pressing step are performed in a single step, each of the drawing step, bending step and pressing step may be performed separately.

Second Embodiment

Figure 7:
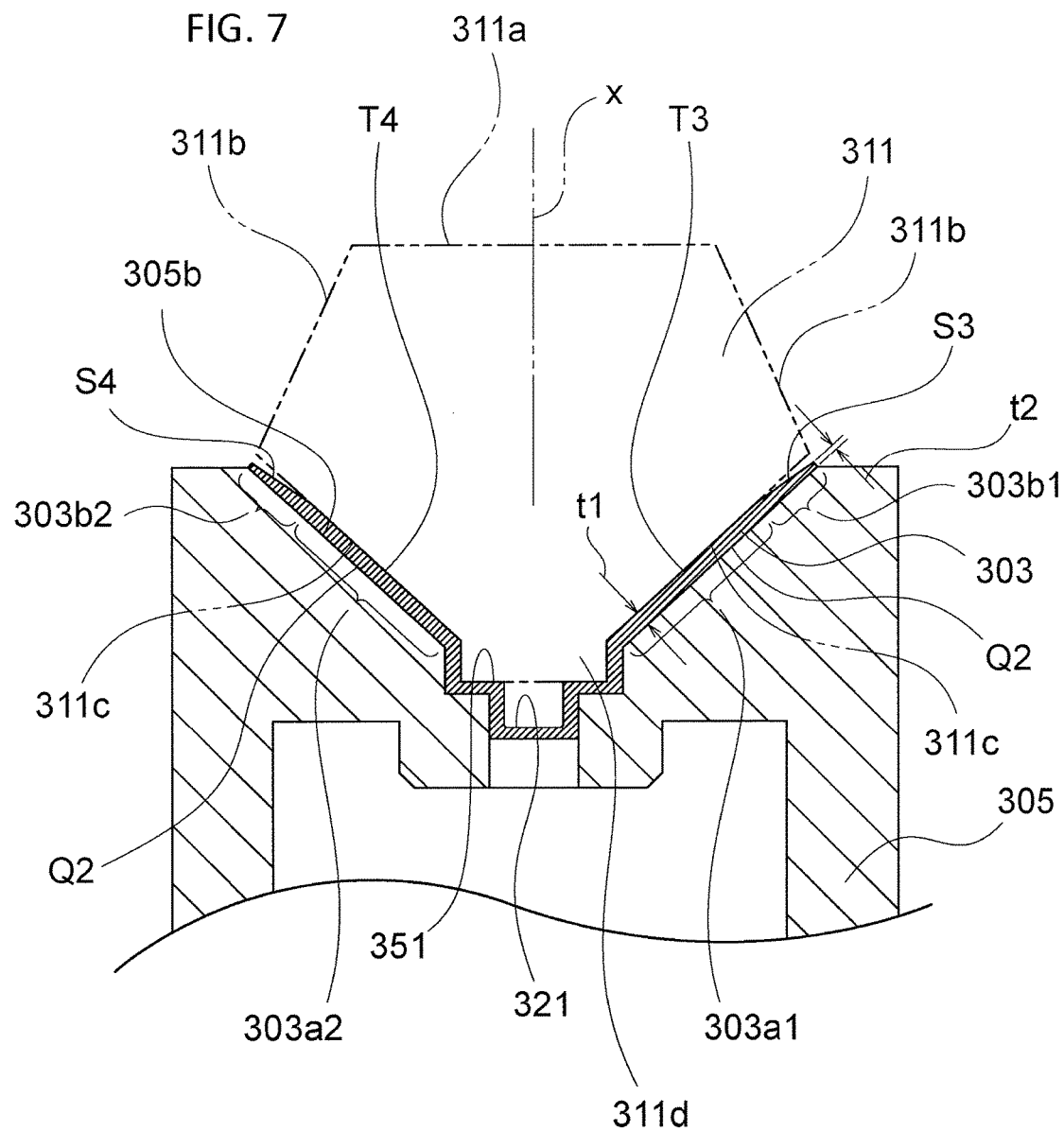
FIG. 7 is a cross sectional view illustrating a rack guide of the second embodiment.

FIG. 7 is a cross sectional view illustrating, similarly to a cross section shown in FIG. 3, a rack guide 303 and a rack guide base member 305 constituting a rack and pinion steering device of the second embodiment. Rack guide 303 of the second embodiment, which is different from rack guide 103 of the first embodiment, is formed in a Y-shape and an outer surface Q2 of a rack bar 311, to which rack guide 303 is abutted is constituted by an inclined surface. Elements constituting the rack and pinion steering device except for rack guide 303 and rack guide base member 305 are configured in a conventionally known manner so that the detailed explanation thereof are omitted.

As illustrated in FIG. 7, rack bar 311 is provided with rack teeth 311a to be meshed with a pinion (see reference numeral 109 in FIG. 1.). Rack guide 303 is provided with abutment portions 303a1, 303a2 to be slidably abutted to a rack bar 311 and recessed portions 303b1, 303b2 connected to one ends of abutment portions 303a1, 303a2, and a thickness t1 of abutment portions 303a1, 303a2 is different from a thickness t2 of recessed portions 303b1, 303b2.

Rack bar 311 is abutted to inner surfaces T3, T4, which are abutment surfaces, of abutment portions 303a1, 303a2. When rack guide 303 is received in rack guide base member 305, outer surface Q2 of rack guide 303 is abutted to rack guide base member 305. By a coil spring (see reference numeral 114 in FIG. 1), which is urging means not illustrated in drawings, rack guide 303 is urged against rack bar 311 through rack guide base member 305. Accordingly, an engagement between rack teeth 311a of rack bar 311 and a pinion (see reference numeral 109 in FIG. 1) is maintained through rack guide 303 by rack guide base member 305.

Rack bar 311 is provided with rack teeth 311a, a rack tooth forming portion 311b continued to rack teeth 311a and inclined so as to widen toward the end with respect to a central line x passing through a center of fixing portion 321, an inclined portion 311c to be abutted to rack guide 303, extended so as to narrow at the end with respect to central line x, and a base pedestal portion 311d continued to inclined portion 311c, for positioning with respect to rack bar 311 in a left and right direction of FIG. 7.

Since rack guide 303 has a cross section which is a symmetrical shape with respect to a central line x of rack guide 303, a right half portion of rack guide 303 will be described. Abutment portion 303a1 has one end portion continued to base portion 351 and a thickness t1 of abutment portion 303a1 is constant. A recessed portion 303b1 is continued to the other portion of abutment portion 303a1. A thickness t2 of recessed portion 303b1 becomes gradually decreasing, as recessed portion 303b1 becomes away from abutment portion 303a1. Namely, as recessed portion 303b1 becomes away from abutment portion 303a1, an inner surface S3 of recessed portion 303b1 extends to become closer to an outer surface Q2. Further, outer surface Q2 constituting abutment portion 303a1 and recessed portion 303b1 extends linearly so as to have a single inclination. Accordingly, outer surface Q2 of abutment portion 303a1 and recessed portion 303b1 extending at a right side and outer surface Q2 of abutment portion 303a2 and recessed portion 303b2 extending at a left side are symmetrical with respect to a central line x and have single inclinations, respectively.

Base portion 351 has a shape complementary to a shape of base pedestal portion 311d and is a concave portion for containing base pedestal portion 311d of rack bar 311. Further, a bottomed cylindrical fixing portion 321 (see reference numeral 121 in FIG. 2) is provided at a substantially center of base portion 351, similarly to fixing portion 121 of rack guide 103 of the first embodiment. When this fixing portion 321 is received in a through opening with which rack guide base member 305 is provided, rack guide 303 is positioned with respect to rack guide base member 305.

Since, as described above, abutment portion 303a2 and recessed portion 303b2 positioning at a left side, and abutment portion 303a1 and recessed portion 303b1 positioned at a right side are symmetrical with respect to central line x, it is configured that inner surfaces T3, T4 of rack guide 303 are abutted to rack bar 311, and recessed portions 303b1, 303b2 are not abutted to rack bar 311. A thickness t1 of abutment portions 303a1, 303a2, a thickness t2 of recessed portions 303b1, 303b2, inclinations of recessed portions 303b1, 303b2, and so on may be altered as required.

In addition, similarly to the first embodiment illustrated in FIG. 5, rack guide 303 is formed from a member laminated in three layers and is provided with a base plate B constituted by a steel plate and so on, a porous sintered metal layer S formed by sintering metallic powder of bronze series or the like on base plate B, a resin layer R formed in a thin film like form on porous sintered metal layer S from a material containing a tetrafluoroethylene resin, thereby bringing out functions and effects similarly to the first embodiment. Further, similarly to the first embodiment, rack guide 303 may be formed by a two layered member.

Although a mold for rack guide 303 to be used is different from that for rack guide 103 since rack guides 103, 303 of the first and second embodiments are different in shape from each other, rack guide 303 may be manufactured by a process same as that of the first embodiment. First, a material member as a work piece formed in a predetermined shape and a dimension by blanking is prepared. By a press apparatus, I) a drawing step for forming fixing portion 321; II) a bending step for bending the material member so as to have a predetermined shape; and III) a pressing step for performing processing to have a predetermined thickness, are carried out. The press apparatus of the embodiment is the same as that explained in the first embodiment except for the pair of dies.

Upper die (see reference numeral 211 in FIG. 6) has upper press surfaces complementary to inner surfaces T3, T4, S3, S4, which are abutment surfaces of abutment portions 303a1, 303a2 of rack guide 303 which is a finished product; and a lower die (see reference numeral 213 in FIG. 6) has a lower press surface (see reference numeral 213a in FIG. 6) complementary to an outer surface Q2 of rack guide 303 which is the finished product. Namely, upper press surfaces are concave surfaces having inclinations same as those of inner surfaces T3, T4, S3, S4 of rack guide 303; and a lower press surface is a concave surface having an inclination same as that of an outer surface Q2 of rack guide 303. It is needless to say that the upper and lower dies are provided with press surfaces complimentary to a shape of base portion 351.

The upper die and lower die are joined together so that abutment portions 303a1, 303a2 are formed in such a manner that an upper surface of material member which is a semifinished product is formed so as to have a predetermined inclination, and a portion where recessed portions 303b1, 303b2 to be formed is pressed (namely plastically deformed) to have a predetermined thickness so that inner surfaces S3, S4 having a predetermined inclination are formed. On the other hand, an outer surface Q2 having a predetermined inclination is formed at a lower surface of the material member. As discussed above, a shape of upper surface Q2 of rack guide 303 to be abutted to rack guide base member 305 can be simplified so that close contact between both members can be obtained. As a result, quietness of the rack and pinion steering device can be ensured.

Although the manufacturing method of this embodiment is provided with a pressing step for making resin layer R plastically deformed, a grinding step in which recessed portions 303b1, 303b2 are made to have a predetermined thickness by grinding resin layer R may be provided in place of the pressing step. Further, although it is configured in this embodiment that the drawing step, bending step and pressing step are performed in a single process, each of the drawing step, bending step and pressing step may be performed separately.

Third Embodiment

Figure 8:
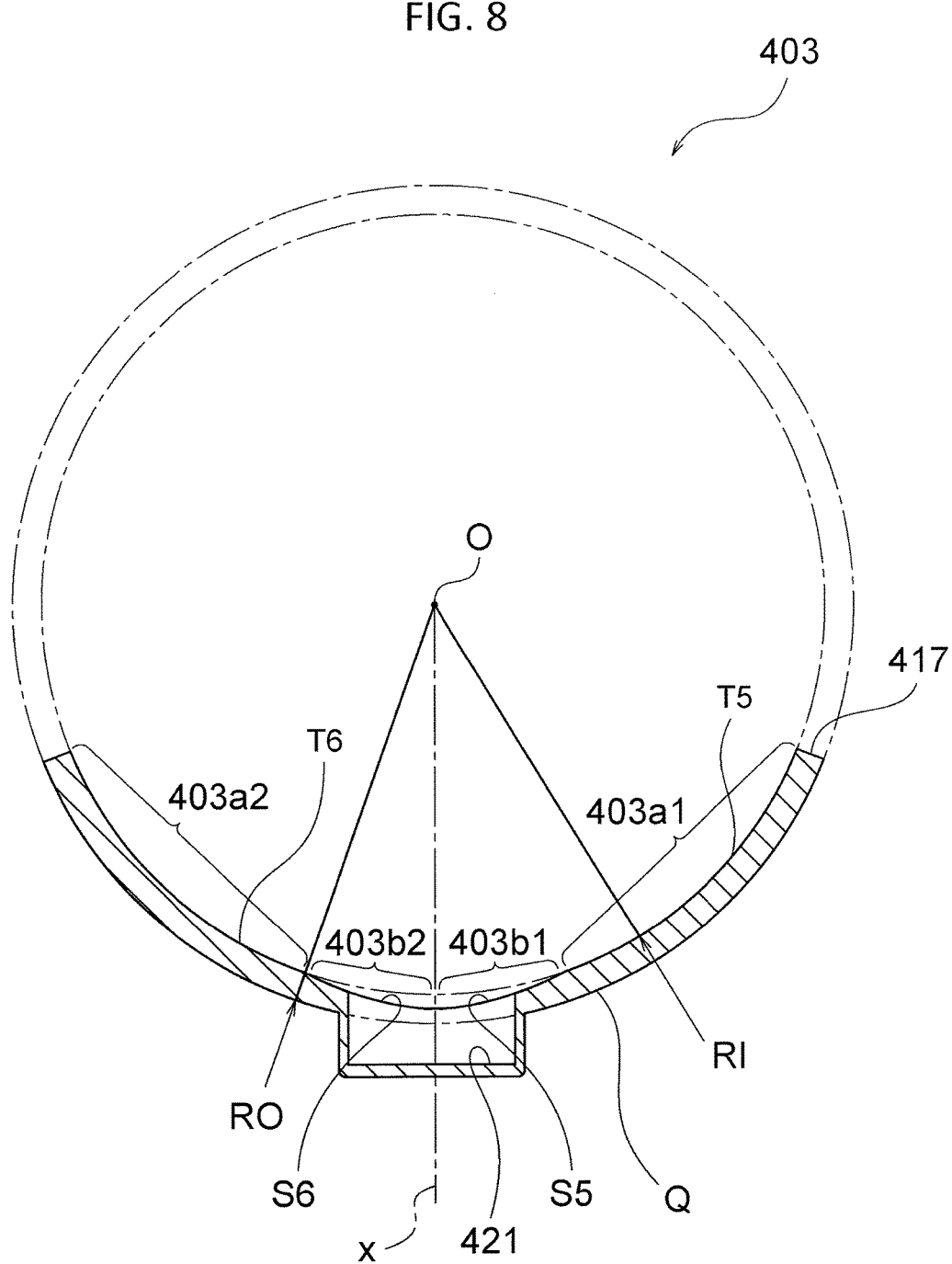
FIG. 8 is a cross sectional view illustrating a rack guide of the third embodiment.

A rack guide 403 of the third embodiment will be described with reference to FIG. 8. FIG. 8 is a cross sectional view illustrating a rack guide 403 of the third embodiment. This cross section is, similarly to rack guide 103 of the first embodiment shown FIG. 3, a cross sectional view taken along an imaginary plane dividing a straight line like edge portion 417 into two equal parts and passing a central line x of fixing portion 421. Rack guide 403 is a modified example in which positions of the abutment portions and recessed portions of rack guide 103 of the first embodiment is altered, and may be incorporated into rack and pinion steering device 101 shown in FIG. 1 in place of rack guide 103. Accordingly, FIGS. 1 to 4 are referred as required. In addition, a structure, effects and so on of rack guide 403 not specifically explained are similar to those of rack guide 103 of the first embodiment.

As illustrated in FIG. 8, rack guide 403 is provided with abutment portions 403a1, 403a2, to which a rack bar (see reference numeral 111 of FIG. 1) is to be slidably abutted, and recessed portions 403b1, 403b2, continued to abutment portions 403a1, 403a2, to be spaced away from rack bar.

Unlike rack guide 103 of the first embodiment, abutment portions 403a1, 403a2 are formed at portions close to a straight line like edge portion 417 and recessed portions 403b1, 403b2 are formed at a portion close to a central line x. A thickness dimension of recessed portions 403b1, 403b2 is different from a thickness dimension (a difference between RO and RI) of abutment portions 403b1, 403b2. Further, in this embodiment, an outer surface Q constituting a support surface of rack guide 403 to be abutted to a rack guide base member (see reference numeral 105 of FIG. 1) has a single curvature radius RO.

When viewed in a plan view, rack guide 403 is provided with two straight line like edge portions 417, which are parallel to each other and two circular arc-shaped portions (corresponding to reference numeral 119 in FIG. 2) connected with the circular arc-shaped portions. Additionally, similarly to the first embodiment, rack guide 403 has a fixing portion 421, which is formed by drawing and so on as a concave portion at a center thereof when viewed in a plan view. Fixing portion 421 is inserted into a through opening formed at a rack guide base member (see reference numeral 105 in FIG. 1) so that positioning of rack guide 403 is made with respect to the rack guide base member. In this embodiment, fixing portion 421 is disposed so as to be surrounded by abutment portions 403a1, 403a2.

Since, as illustrated in FIG. 8, a cross section of rack guide 403 is a symmetrical shape with respect to a central line x of rack guide 403, a right half portion of rack guide 403 will be described. In rack guide 103 of the first embodiment, abutment portion 103a1 and recessed portion 103b1 are provided in the sequence toward a straight line like edge portion 117 from a side of central line x. In contrast, in rack guide 403 of this embodiment, recessed portion 403b1 and abutment portion 403a1 are provided in the sequence toward a straight line like edge portion 417 from a side of central line x.

Furthermore, in the cross sectional view of FIG. 8, a thickness of recessed portion 403b1 becomes gradually decreasing as recessed portion 403b1 becomes away from abutment portion 403a1. Namely, as recessed portion 403b1 becomes away from a central line x, an inner surface S5 of recessed portion 403b1 extends so as to become away from an outer surface Q. Further, although inner surface S5 of recessed portion 403b1 is a circular arc like shape with a predetermined center of curvature, the center of curvature and a curvature radius may be set as required within an extent that a thickness of recessed portion 403b1 is smaller than that of abutment portion 403a1.

On the other hand, an inner surface T5, which is an abutment surface of abutment portion 403a1 continued to recessed portion 403b1 extends on a circumference of a curvature radius RO having a center of curvature O. Outer surface Q of abutment portion 403a1 has a curvature radius represented by RI having a center of curvature O. Namely, a thickness dimension (length in a radius direction with respect to a center of curvature O) of abutment portion 403a1 is constant.

In this embodiment, a curvature radius of circular arc-shaped portion 111b (see FIG. 3) of rack bar 111 is the same dimension as a curvature radius RO of abutment portions 403a1, 403a2.

Since abutment portion 403a2 and recessed portion 403b2 positioned at a left side with respect to a central line x as illustrated in FIG. 8, as described above, are symmetrical to abutment portion 403a1 and recessed portion 403b1 positioned at a right side with respect to the central line x, it is configured that inner surfaces T5, T6 of rack guide 403 are abutted to rack bar 111 and recessed portions 403b1, 403b2 of rack guide 403 are not abutted to rack bar 111 (see FIG. 3.). A position of a center of curvature O and dimensions of curvature radiuses RO, RI, of recessed portions 403b1, 403b2 may be set in accordance with a dimension of area of abutment portion 403a to be abutted to circular arc-shaped portion 111b of rack bar 111.

In addition, similarly to rack guide 103 of the first embodiment, rack guide 403 is a member laminated in three layers and is provided with a base plate B constituted by a steel plate and so on, a porous sintered metal layer S formed by sintering metallic powder of bronze series or the like on base plate B, a resin layer R formed on porous sintered metal layer S in a thin film like form from a material containing a tetrafluoroethylene resin, as illustrated in FIG. 5.

Accordingly, similarly to rack guide 103 of the first embodiment, rack guide 403 brings out effects that damage due to abrupt wear-out and seizure of rack bar 111 can be prevented from occurring, even if rack bar 111 is slid on porous sintered metal layer S.

Furthermore, as a three-layer structure used for rack guide 403, Oiles Drymet LF, ST manufactured by OILES CORPORATION and so on may be utilized. Since it is configured that resin layer R is provided, a thickness of rack guide 403 can be readily adjusted.

As described above, since porous sintered metal layer S is provided underneath resin layer R, regardless of that a thickness of resin layer R is relatively thin, strength of rack guide 403 necessary for functioning as rack guide can be ensured.

Furthermore, a manufacturing method of rack guide 403 of this embodiment is the same as that of first embodiment except for a pair of dies having a shape complementary to a shape and a dimension of the recessed portions and the abutment protons, so that the detailed explanation thereof is omitted.

A rack guide may be configured by combining recessed portions 103b1, 103b2, 403b1, 403b2 of the first and third embodiments, as required. Namely, it is configured that a plurality of recessed portions spaced away from each other are formed at a side of central line x and at a side of a straight line like edge portion, and an abutment portion is provided therebetween. Further, it may be configured that a rack guide is provided not with a recessed portion and an abutment portion which are symmetrical to a central line x but with a recessed portion and an abutment portion which are asymmetrical thereto and a number and a dimension of the recessed portion and the abutment portion are differentiated. According to the above mentioned manufacturing method, pressing step is utilized for a recessed portion so that in case of using a same rack guide base member, a rack guide having various recessed portions and abutment portions may be manufactured with a relatively simple method by changing only a shape of an upper die. Of course, a grinding step may be utilized in place of pressing step. Similarly, a position, a number, a dimension and so on of abutment portions 303a1, 303b1 and recessed portions 303b1 303a2, 303b2 of the second embodiment may be altered as required.

Furthermore, it is configured that rack guides 103, 303 of above-mentioned first and second embodiments are provided with abutment protons 103a1, 103a2 positioned at a substantially center and recessed portions 103b1, 103b2 positioned at a side of straight line like edge portion 117, with respect to a central line x. However, a rack guide of the invention is not limited to the configuration. Namely, like a rack guide as disclosed in patent literature 1, it can be configured that an additional area having different curvature radius within abutment portions 103a1 103a2 is provided to reduce an area in contact with circular arc-shaped portion 111b of rack bar 111.

Although, in the first and third embodiments, it is configured that rack guides 103, 403 are provided with straight line like edge portions 117, 417 and circular arc-like edge portion 119, the invention is not limited to such rack guide. It is needless to say that, for example, the invention may be applied to what is called a strip like rack guide and the like in which both ends of straight line like edge portion are connected with an edge portion extending linearly in place of the circular edge portion.

Rack guides 103, 303, 403 of the first to third embodiments are configured by a member of a three-layer structure having resin layer R. However, the invention is not limited to this configuration. For example, a rack guide may be formed by utilizing a two-layered structure in which porous sintered metal layer S or a metal-sintered alloy layer containing a solid lubricant is laminated on base plate B. OILES Toughmet and the like manufactured by OILES CORPORATION are exemplified as a member of two layered structure having a metal-sintered alloy layer containing a solid lubricant. In case where a member having a two-layered structure is utilized, a recessed portion may be formed by a step of grinding porous sintered metal layer S or a metal-sintered alloy layer containing a solid lubricant.

A thickness of recessed portion of the first to third embodiments is configured to gradually decrease as the recessed portion becomes away from an abutment portion. However, the invention is not limited to this configuration. For example, it can be configured that a gap is provided between the recessed portion and the abutment portion. It is needless to say that although an inner surface of recessed portion of rack guides 103, 303, 403 of the first to third embodiments is a circular arc shape or a straight line shape, the inner surface can be formed in a various shape as long as that it makes no contact with rack bars 111, 311.

This application claims the benefit of Japanese Patent Application No. 2012-253439, filed Nov. 19, 2012, which is hereby incorporated by reference herein in its entirety.

EXPLANATION OF REFERENCE NUMERAL 101 rack and pinion steering device
103, 303, 403 rack guide
103a1, 103a2, 303a1, 303a2, 403a1, 403a2 abutment portion
103b1, 103b2, 303b1, 303b2, 403b1, 403b2 recessed portion
105, 305 rack guide base member
107 casing
109 pinion
111, 311 rack bar
113 steering axis
114 coil spring
201 press apparatus
203 material member
211, 213 die
T1, T2, T3, T4, T5, T6, S1, S2, S3, S4, S5, S6 inner surface
Q, Q2 outer surface

What is claimed is:
1. A rack and pinion steering device comprising:
a casing;
a pinion to be slidably supported by said casing;
a rack bar having a rack tooth meshed with said pinion;
a rack guide comprising an abutment portion having an abutment surface to which said rack bar is to be slidably abutted and a recessed portion, which is continued to said abutment portion, to be spaced from said rack bar;
a rack guide base member for receiving said rack guide; and
an urging unit for urging said rack guide against said rack bar through said rack guide base member,
wherein, in a cross sectional view along a central line of the rack guide, a thickness dimension of said recessed portion is different from that of said abutment portion, the abutment surface and an abutment portion outer surface to face the rack guide base member have a common center of curvature and each of the abutment surface and the abutment portion outer surface has a single curvature of radius.

2. A rack and pinion steering device according to claim 1, wherein said thickness dimension of said recessed portion becomes gradually decreasing as the recessed portion becomes away from said abutment portion.

3. A rack and pinion steering device according to claim 2, wherein an abutment surface of abutment portion to be abutted to said rack bar has a surface constituted by a plastic material.

4. A rack and pinion steering device according to claim 3, wherein an outer surface of said rack guide to be abutted to said rack guide base member has a single curvature radius, or a single inclination at each of a right side and a left side with respect to the central line.

5. A rack and pinion steering device according to claim 3, wherein said plastic material is a resin, a porous metal or a sintered alloy.

6. A rack and pinion steering device according to claim 2, wherein an outer surface of said rack guide to be abutted to said rack guide base member has a single curvature radius, or a single inclination at each of a right side and a left side with respect to the central line.

7. A rack and pinion steering device according to claim 1, wherein the abutment surface is constituted by a plastic material.

8. A rack guide manufacturing method according to claim 7, wherein said plastic material is a resin, a porous metal or a sintered alloy.

9. A rack and pinion steering device according to claim 7, wherein an outer surface of said rack guide to be abutted to said rack guide base member has a single curvature radius, or a single inclination at each of a right side and a left side with respect to the central line.

10. A rack and pinion steering device according to claim 1, wherein an outer surface of said rack guide to be abutted to said rack guide base member has a single curvature radius, or a single inclination at each of a right side and a left side with respect to the central line.

11. A rack guide manufacturing method for manufacturing a rack guide for a rack and pinion steering device, to be received by a rack guide base member, said rack guide comprising:
an abutment portion to which a rack bar is to be abutted; and a recessed portion to be spaced away from said rack bar, said abutment portion being capable of supporting said rack bar in such a manner that a pinion and said rack bar are meshed with each other,
wherein, in a cross sectional view along a central line of the rack guide, processing is made to a work piece to have a predetermined thickness in such a manner that a thickness dimension of said recessed portion is different from that of said abutment portion, the abutment surface and an abutment portion outer surface to face the rack guide base member have a common center of curvature and each of the abutment surface and the abutment portion outer surface has a single curvature of radius.

12. A rack guide manufacturing method according to claim 11, wherein a portion of said work piece becoming the abutment surface is formed from a resin, a porous metal or a sintered alloy.

13. A rack guide manufacturing method according to claim 12, wherein processing in which said work piece is made to have said predetermined thickness is performed by pressing a portion of said work piece becoming said recessed portion.

14. A rack guide manufacturing method according to claim 13, wherein bending is performed in such a manner that an outer surface of said rack guide, so as to be abuttable to said rack guide base member, has a single curvature radius, or a single inclination at each of a right side and a left side with respect to the central line.

15. A rack guide manufacturing method according to claim 12, wherein bending is performed in such a manner that an outer surface of said rack guide, so as to be abuttable to said rack guide base member, has a single curvature radius, or a single inclination at each of a right side and a left side with respect to the central line.

16. A rack guide manufacturing method according to claim 11, wherein bending is performed in such a manner that an outer surface of said rack guide, so as to be abuttable to said rack guide base member, has a single curvature radius, or a single inclination at each of a right side and a left side with respect to the central line.

17. A rack guide for a rack and pinion steering device, to be received by a rack guide base member, said rack guide being capable of supporting a rack bar in such a manner that a pinion and said rack bar are meshed with each other, said rack guide comprising:
an abutment portion having an abutment surface to which said rack bar is to be slidably abutted; and
a recessed portion, which is continued to said abutment portion, to be spaced from said rack bar,
wherein, in a cross sectional view along a central line of the rack guide, a thickness dimension of said recessed portion is different from that of said abutment portion, the abutment surface and an abutment portion outer surface to face the rack guide base member have a common center of curvature and each of the abutment surface and the abutment portion outer surface has a single curvature of radius.

18. A rack guide for a rack and pinion steering device, according to claim 17, wherein said thickness dimension of said recessed portion becomes gradually decreasing as the recessed portion becomes away from said abutment portion.

19. A rack guide for a rack and pinion steering device, according to claim 18, wherein an abutment surface of said abutment portion abuttable to said rack bar is provided with a surface constituted by a resin, a porous metal or a sintered alloy.

20. A rack guide for a rack and pinion steering device, according to claim 19, wherein an outer surface of said rack guide abuttable to said guide base member has a single curvature radius, or a single inclination at each of a right side and a left side with respect to the central line.

21. A rack guide for a rack and pinion steering device, according to claim 18, wherein an outer surface of said rack guide abuttable to said guide base member has a single curvature radius, or a single inclination at each of a right side and a left side with respect to the central line.

22. A rack guide for a rack and pinion steering device, according to claim 17, wherein the abutment surface is constituted by a resin, a porous metal or a sintered alloy.

23. A rack guide for a rack and pinion steering device, according to claim 22, wherein an outer surface of said rack guide abuttable to said guide base member has a single curvature radius, or a single inclination at each of a right side and a left side with respect to the central line.

24. A rack guide for a rack and pinion steering device, according to claim 17, wherein an outer surface of said rack guide abuttable to said guide base member has a single curvature radius, or a single inclination at each of a right side and a left side with respect to the central line.

25. A rack guide for a rack and pinion steering device, according to claim 17, wherein, in the cross sectional view along the central line of the rack guide, a recessed portion outer surface of the recessed portion to face the rack guide base member and the abutment portion outer surface have a common center of curvature, and the recessed portion outer surface and the abutment portion outer surface have a same curvature of radius.

* * * * *